US005962998A

United States Patent [19]

Bowers et al.

[11] Patent Number: 5,962,998

[45] Date of Patent: Oct. 5, 1999

[54] CIRCUIT FOR AUTOMATIC OPERATION OF A SERIES BRAKE UPON DETECTION OF ARMATURE CURRENT LOSS

[75] Inventors: Patrick J. Bowers; Joseph M. Palma, both of Columbia, S.C.

[73] Assignee: Square D Company, Palatine, Ill.

[21] Appl. No.: 09/222,332

[22] Filed: Dec. 29, 1998

[51] Int. Cl.[6] .......... H02K 7/10

[52] U.S. Cl. .......... 318/372; 361/93

[58] Field of Search .......... 318/285, 372, 318/375–381, 382, 246–252, 742; 361/93, 87, 57, 31; 212/276, 278, 281, 285, 284

[56] References Cited

U.S. PATENT DOCUMENTS

| | | | |
|---|---|---|---|
| 3,584,706 | 6/1971 | Hall | 187/29 R |
| 3,601,672 | 8/1971 | Horsley | 318/204 |
| 3,624,783 | 11/1971 | Chang | 214/16 R |
| 4,207,508 | 6/1980 | Habisohn | 318/742 |
| 4,509,620 | 4/1985 | Verbos | 188/171 |
| 5,814,955 | 9/1998 | Bauer et al. | 318/376 |

*Primary Examiner*—William M. Shoop, Jr.
*Attorney, Agent, or Firm*—David R. Stacey; Larry T. Shrout; Larry I. Golden

[57] ABSTRACT

A circuit for initiating the setting of a series brake upon detecting a loss of armature current in an overhauling DC crane motor. The circuit includes an ammeter shunt, a meter relay and associated contact, a meter relay power supply, a control relay and associated contact, a low current relay and associated contact and two static timers which can be added to an existing crane operating circuit. The ammeter shunt is located electrically in series with motor armature for monitoring current flow in the armature. The meter relay is connected to the ammeter shunt such that it will operate in response to a signal from the ammeter shunt indicating that current in the motor armature has dropped below a predetermined level. The meter relay requires power for operation, this power being provided by the 24 VDC power supply. To ensure that a false armature current loss signal is not processed by the meter relay at the beginning of a lowering operation, a static timer is placed in series with the power supply relay to delay the power supply operation until the armature current is above the predetermined minimum level. In response to a loss of armature current, the meter relay operates the associated contact, which in turn operates a low current relay and associated contact and a control relay and associated contact. These relays and contacts cause a lowering relay in the control circuit to energize and open an associated contact in the crane motor circuit. Opening of the crane motor circuit de-energizes a series-wound solenoid, thereby setting a series mechanical brake controlled by the series-wound solenoid.

6 Claims, 4 Drawing Sheets

CIRCUIT FOR AUTOMATIC OPERATION OF A SERIES BRAKE UPON DETECTION OF ARMATURE CURRENT LOSS

FIELD OF THE INVENTION

The present invention relates to crane operating circuits and in particular to a circuit arrangement for detecting armature current loss in the crane lowering motor and the setting of a series brake upon the detected current loss.

BACKGROUND OF THE INVENTION

Cranes are important to heavy industry where there is a need to hoist and move heavy loads from one location to another within the crane's service area. Since these loads can be extremely heavy and can include molten metals in the iron and steel industries, it can easily be seen that an automatic braking system to stop the lowering of the load during abnormal conditions is important. U.S. patent application Ser. No. 09/067,119, entitled "A Circuit for Automatic Operation a Series Brake Upon Power Loss During a Regenerative Braking Period", and incorporated herein by reference, addresses conditions of power loss to the crane motor and control circuits. There is, however, another condition that can adversely effect the normal lowering process and setting of a series brake during an overhauling condition due to a heavy load. This condition is a loss of current in the armature circuit of the dynamic lowering motor while current from the power source continues to flow in the rest of the motor circuit, including the series field and series-wound coil controlling the setting of the series brake and in motor control circuit. During normal lowering operations, current flowing in the armature and series field is controlled in such a manner as to produce a counter-torque in the motor. This counter-torque opposes the accelerating downward movement of the crane's load. To produce this counter-torque there must be current flow in both the series field and the armature. A loss of current in the series field would also result in a loss of current in the series-wound solenoid coil controlling the series brake, thus setting the series brake. However, a loss of current in the armature would not set the series brake and the load would continue to fall. It is therefore important that circuitry for detecting armature current loss and setting of the series brake be included in the crane control circuit.

SUMMARY OF THE INVENTION

The present invention provides a circuit for monitoring current flow in a crane lifting motor and setting the series brake on detection of a loss of current in the armature circuit during dynamic lowering. This circuitry can be provided in a factory assembled crane control circuit, or in an easily installable kit for retrofitting existing crane motor circuits. The components of the circuit include an ammeter shunt, a meter relay, a 24 VDC power supply, a power supply relay, a low current relay, a control relay and two static timers. The ammeter shunt is electrically in series with the lifting motor armature for monitoring current flow in the armature circuit. The meter relay is a relatively low current monitoring relay that responds to the signal from the ammeter shunt. The meter relay requires power from the 24 VDC power supply for operation. This power supply is activated by the power supply relay each time the crane control master switch is placed in any of the lowering positions. The power supply relay is in series with a first one of the static timers in the lowering circuit. The first static timer provides a short delay before activating the power supply. This short delay allows the current in the armature circuit to reach a point above the predetermined minimum level of armature current before activating the meter relay. This prevents the meter relay from indicating a loss of armature current immediately after the master switch has been placed in one of the lowering positions. If current in the armature circuit drops below the predetermined minimum level during a lowering operation, the meter relay will detect the current loss from the ammeter shunt signal. When this signal from the ammeter shunt drops below the predetermined value, indicating a loss of current in the armature circuit, the meter relay closes the meter contact, which energizes the low current relay and in turn closes the low current contact located in series with the control relay and the second static timer. After the short delay initiated by the static timer, the control relay opens the control contact located in the first lowering speed circuit thereby de-energizing the L1 relay, opening the L1 contact in the motor circuit. By opening the L1 contact, the series brake is automatically set due to a loss of current in the series-wound solenoid controlling the series brake.

Figure 1:
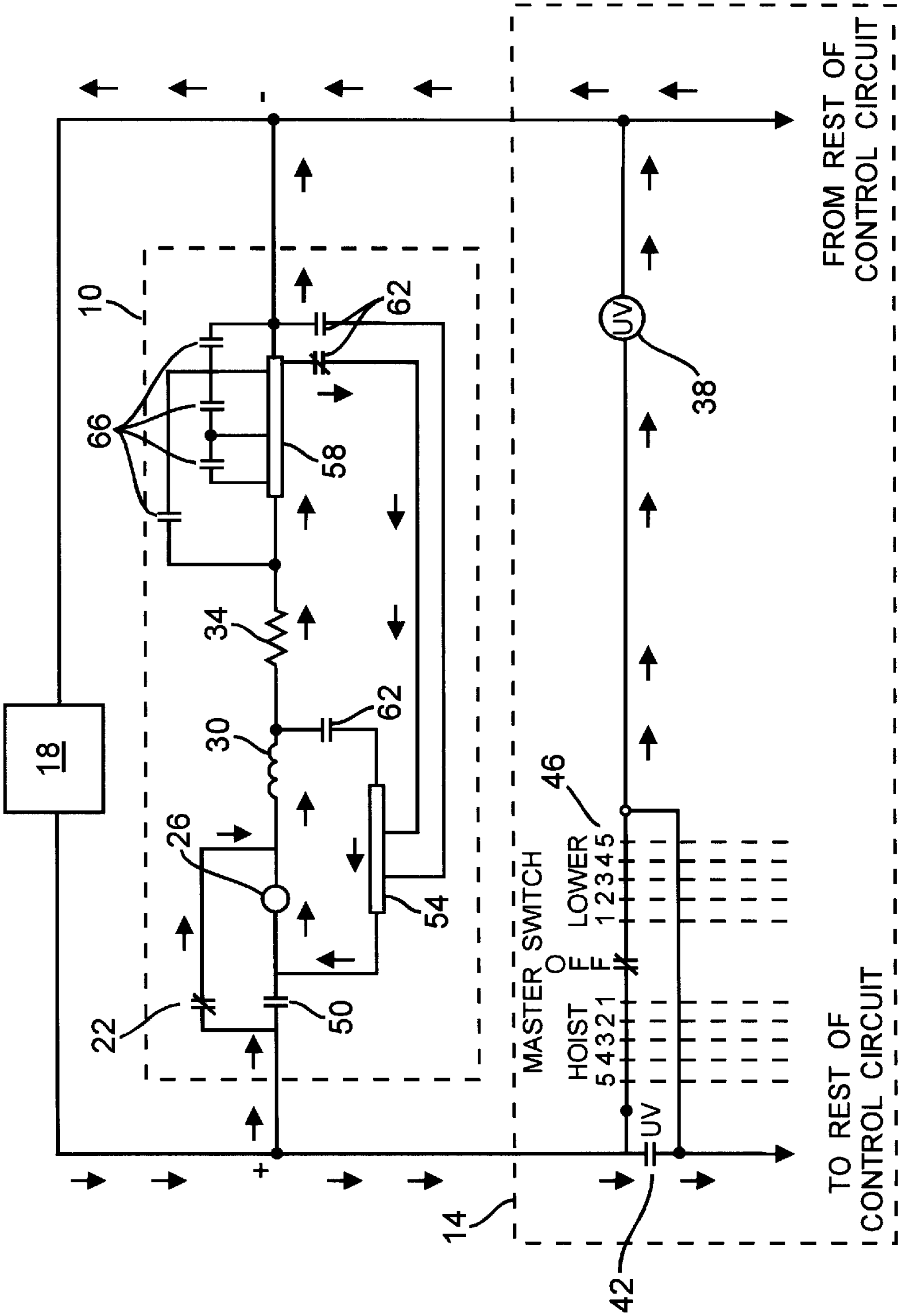
FIG. 1 is a circuit diagram of a typical crane operating circuit of the prior art configured in a normal lowering mode.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DESCRIPTION OF THE PREFERRED EMBODIMENT

FIG. 1 illustrates a crane operating circuit consisting of a hoist motor circuit 10, and those elements of a crane control circuit 14 that are relevant to the following discussion of the present invention, both circuits 10 and 14 being typical of the prior art. In FIG. 1, the arrows indicate the direction of current flow, during a load lowering operation. During the lowering operation, the series DC motor is operating to oppose the downward pulling weight of the load and thereby permit a controlled descent of the load. A DC power source 18 provides operating power for both circuits 10 and 14. In the motor circuit 10, current passes through a lowering contact 22, a motor armature 26, a series field 30 (the motor), and a series-wound solenoid coil 34. Current flow in the series-wound solenoid coil 34 keeps a mechanical series brake from being engaged while the crane hoist motor is being operated. In crane control circuit 14, an undervoltage (UV) relay 38 monitors the voltage level and is intended to open an undervoltage (UV) contact 42 in the event of a loss of power from the power supply 18, thereby interrupting current flow in both the control circuit 14 and the motor circuit 10. A master switch 46 in the control circuit 14 controls the lowering or hoisting state of the crane by selectively opening or closing the lowering contact 22 and hoisting contact 50 in the motor circuit 10. The master switch 46 also controls the lowering and hoisting speed by selecting resistance values for a dynamic braking resistor 54 and an acceleration resistor 58. Selectively opening and closing contacts 62 associated with the dynamic braking resistor 54 and contacts 66 associated with the acceleration resistor 58 accomplish the selection of resistance values. Circuits 10 and 14 are illustrated in a lowering configuration; therefore, the hoist contact 50 in the motor circuit 10 is open.

Figure 2:
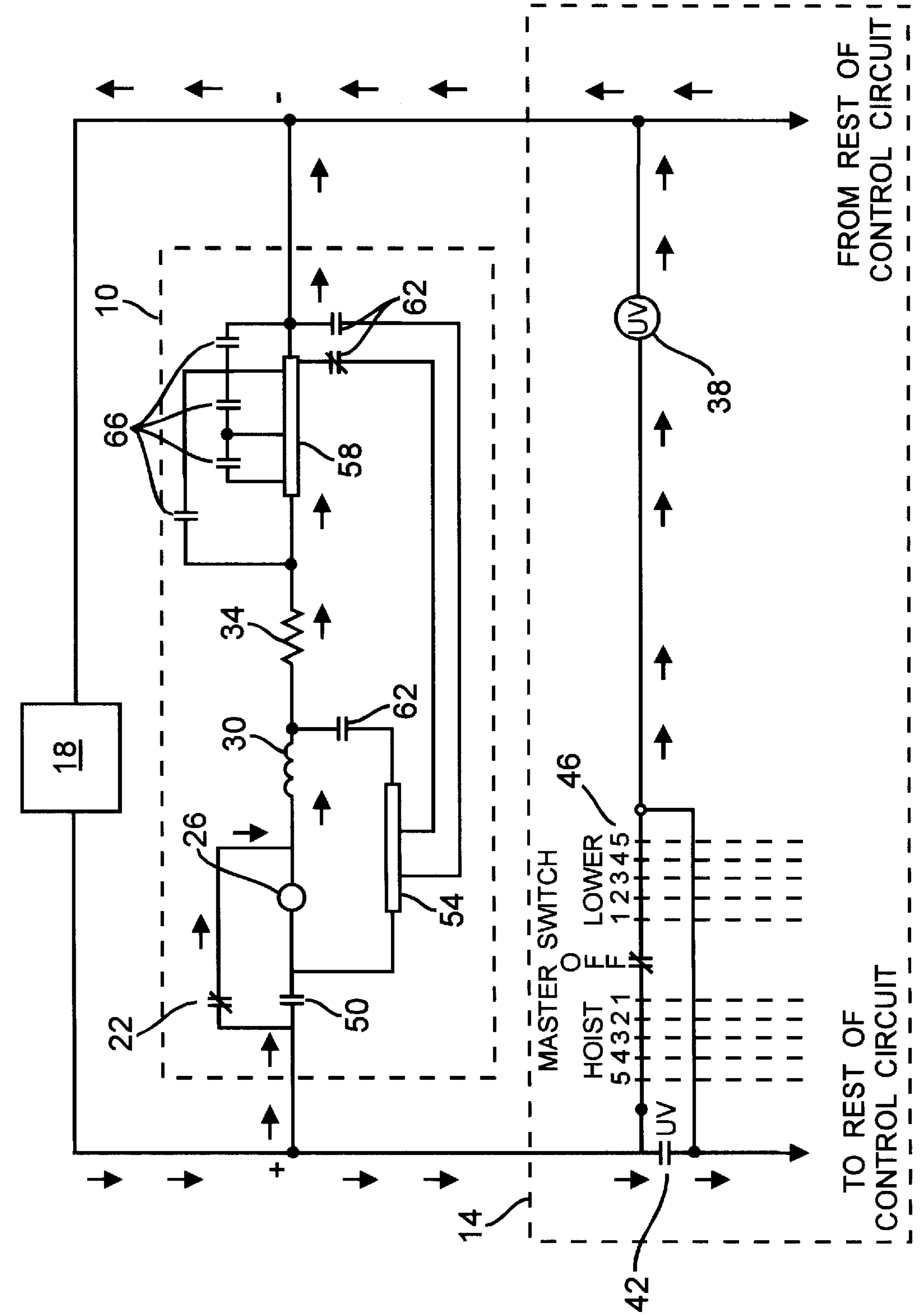
FIG. 2 illustrates the circuit of FIG. 1 with a loss of armature current.

FIG. 2 illustrates the motor circuit 10 and control circuit 14 of FIG. 1 with a loss of current in the armature 26. In this condition, it can be seen that current still flows in the remaining parts of the motor circuit 10, thus maintaining the series-wound solenoid coil 34 in an activated condition and thereby preventing the series brake from setting. The UV relay 38 will not open the UV contact 42, and therefore does not open the motor and control circuits, 10 and 14, respectively. Further, since there is no current flow in the armature 26, selectively regulating the resistance of the dynamic braking resistor 54 or the acceleration resistor 58 will have little, if any, effect on controlling the rate of decent of the crane's load. Loss of armature current can result from the burning open of the dynamic breaking resistor 54 or the failure to open of any of the associated contacts 62.

Figure 3:
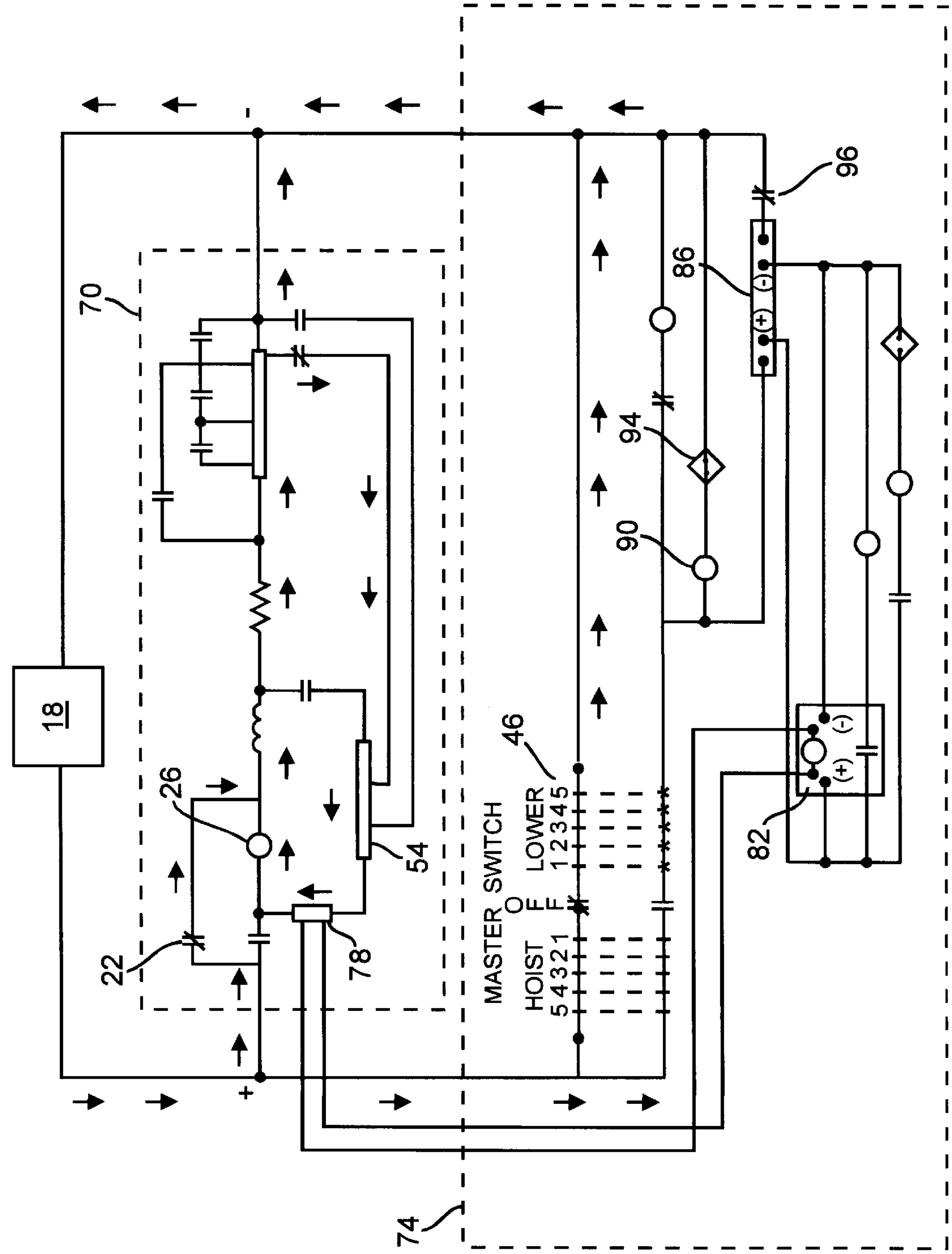
FIG. 3 is a circuit diagram a crane operating circuit constructed in accordance with the present invention configured in a normal lowering mode.

FIG. 3 illustrates a motor circuit 70 and crane control circuit 74 in accordance with the present invention, wherein a normal lowering operation with current in the armature 26 is depicted. In the description of these circuits 70 and 74, elements common to circuits 10 and 14 of the prior art of FIGS. 1 and 2 will use the same reference numerals. An ammeter shunt 78 is located electrically in series with the lifting motor armature 26 for monitoring current flow in the armature 26. A meter relay 82 responds to a signal from the ammeter shunt 78. A suitable meter relay is available from Crompton Instruments Inc., 100 Chastain Center Blvd., Kennesaw, Ga., part no. 239-307A-GBRL-C6-S1. The meter relay 82 is a relatively low current monitoring relay that requires power from a 24 VDC power supply 86 for operation. A suitable power supply is available from Kepco, Inc. 121-38 Sanford Ave., Flushing, N.Y., part no. FAW24-2.1K. This power supply 86 is activated by a power supply relay 90 each time the crane control master switch 46 is placed in any of the lowering positions. The power supply relay 90 is in series with a first static timer 94 in the lowering circuit. The first static timer 94 provides a short delay (1.2 sec.) before activating the power supply relay 90 and closing a power supply contact 96 located in series with the power supply 86. This short delay allows the current in the armature 26 to reach a point above the predetermined minimum level of armature current before activating the meter relay 82. This prevents the meter relay 82 from indicating a loss of armature current immediately after the master switch 46 has been placed in one of the lowering positions.

Figure 4:
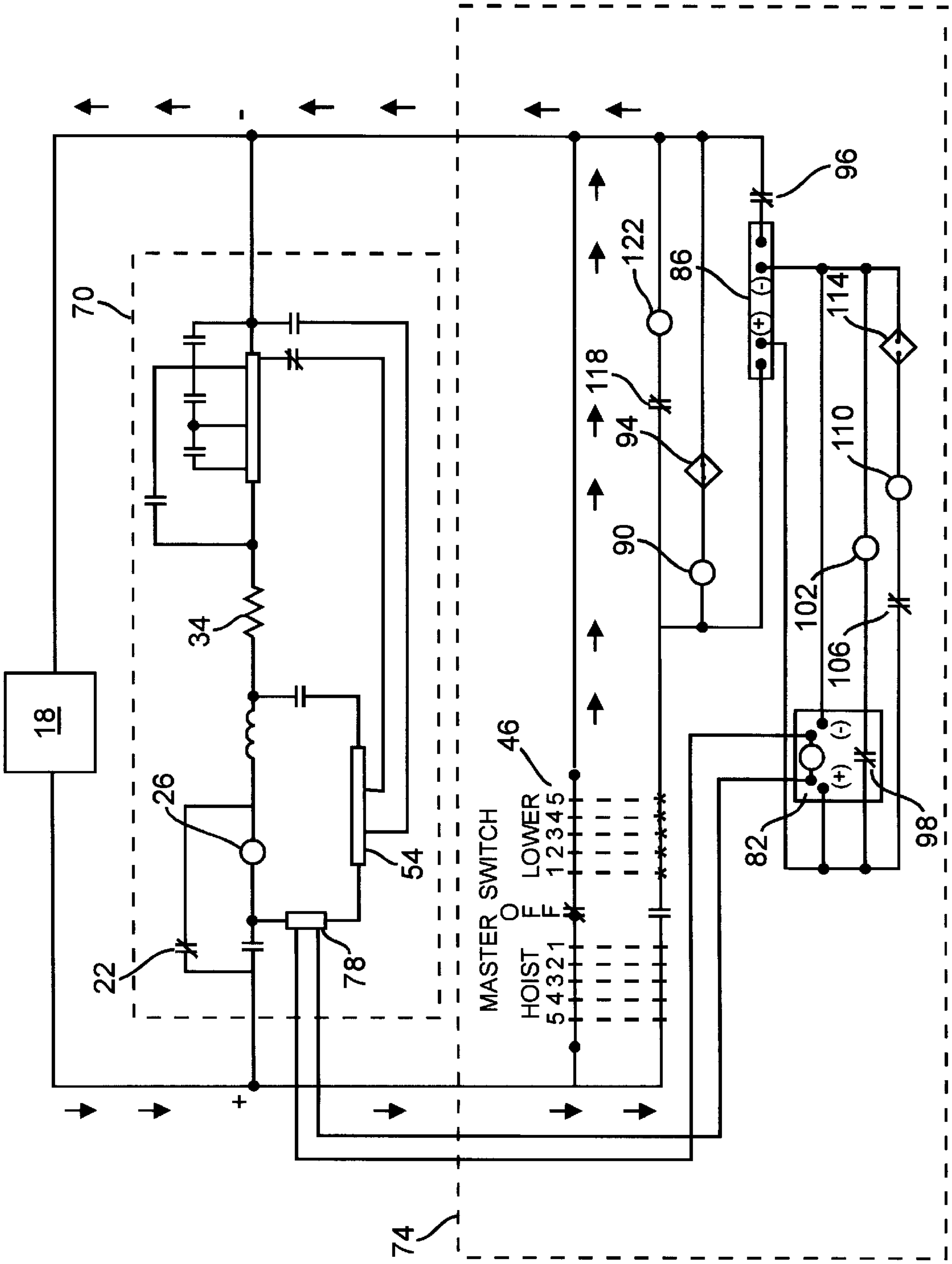
FIG. 4 is a circuit diagram of the crane operating circuit of FIG. 3 configured in a normal lowering mode with a loss of current in the armature circuit.

FIG. 4 illustrates the circuits 70 and 74 in a lowering operation with a loss of current in the armature 26. If current in the armature 26 drops below the predetermined minimum level during a lowering operation, the meter relay 82 will detect the current loss from the ammeter shunt signal. When the signal from the ammeter shunt 78 drops below a predetermined value, indicating a loss of current in the armature 26, the meter relay 82 closes a meter contact 98 which energizes a low current relay 102. The energized low current relay 102 closes a low current contact 106 located in series with a control relay 110 and the second static timer 114. The first and second static timers used in this circuit are Class 7001 Type ST-1 Static Timers available from Square D Company. The second static timer 114 ensures the proper sequencing of contact closures in the circuit. After a short delay (0.6 sec.) initiated by the second static timer 114, the control relay 110 opens a control contact 118 located in the first lowering speed circuit. The open control contact 118 de-energizes the L1 relay 122, causing the L1 contact 22 in the motor circuit 10 to open. By opening the L1 contact 22, which is in series with the series-wound solenoid 34 in the motor circuit 10, the series brake is automatically set. This circuit is functional only during overhauling conditions. Therefore, when a crane motor loses current in the armature 26 while lowering without a load, the series brake may not be set. If the crane hook is heavy enough to cause an overhauling condition, or if a permanent weight has been added to the crane the series brake will be set.

I claim:

1. An operating circuit for a crane having a DC lifting motor, a motor circuit and a control circuit, said operating circuit comprising:

- a motor armature located in the DC lifting motor;
- a mechanical series brake for mechanically stopping the rotation of said motor armature;
- a series-wound solenoid for activating said mechanical series brake;
- an ammeter shunt electrically in series with said motor armature for monitoring current flow in said motor armature;
- a meter relay located in said control circuit, said meter relay operating in response to a signal from said ammeter shunt indicating current in said motor armature has dropped below a predetermined level;
- a meter contact associated with said meter relay and being operated in response to said signal from said meter relay;
- a low current relay electrically in series with said meter contact for operating in response to the operation of said meter contact;
- a low current contact associated with said low current relay such that said low current contact operates in response to a signal from said low current relay;
- a control relay located in series with said low current contact such that operation of said low current contact operates said control relay;
- a control contact associated with said control relay such that said control contact operates in response to a signal from said control relay;
- a lowering relay located in series with said control contact such that operation of said control contact operates said lowering relay; and
- a lowering contact associated with said lowering relay and being located in the motor circuit such that said lowering contact is in series with said series-wound solenoid, said lowering contact opening in response to a signal from said associated lowering relay and thereby opening the motor circuit and de-energizing said series-wound solenoid, causing said series mechanical brake to be set.

2. The crane operating circuit of claim 1 wherein said control circuit further includes a 24 VDC power supply for providing power to said meter relay.

3. The crane operating circuit of claim 2 wherein said control circuit further includes a power supply relay located in parallel with said lowering relay such that said power supply contact is energized when power is supplied to said lowering relay.

4. The crane operating circuit of claim 3 wherein said control circuit further includes a power supply contact associated with said power supply relay and located in series with said power supply such that said 24 VDC power supply is activated in response to the closing of said power supply contact.

5. The crane operating circuit of claim 4 wherein said control circuit further includes a first static timer located in series with said power supply relay such that said power supply is not energized until current in said motor armature is above said predetermined level.

6. The crane operating circuit of claim 5 wherein said control circuit further includes a second static timer located in series with said control relay to ensure proper sequencing of contact closures within said crane operating circuit.

* * * * *